(12) United States Patent
Feigel et al.

(10) Patent No.: US 6,886,333 B2
(45) Date of Patent: May 3, 2005

(54) SIGNAL TRANSMITTER COMPRISING A HALL SENSOR INTEGRATED IN A MASTER CYLINDER

(75) Inventors: Hans-Jörg Feigel, Rosbach (DE); Ralf Jakobi, Flörsheim (DE); Wilfried Wagner, Hüttenberg (DE); Dieter Merkel, Darmstadt (DE); Ingo Knewitz, Neu Anspach (DE)

(73) Assignee: Continental Teves AG & Co. oHG, Frankfurt (DE)

(*) Notice: Subject to any disclaimer, the term of this patent is extended or adjusted under 35 U.S.C. 154(b) by 45 days.

(21) Appl. No.: 10/399,934

(22) PCT Filed: Oct. 24, 2001

(86) PCT No.: PCT/EP01/12269
§ 371 (c)(1),
(2), (4) Date: Apr. 24, 2003

(87) PCT Pub. No.: WO02/36400
PCT Pub. Date: May 10, 2002

(65) Prior Publication Data
US 2004/0020201 A1 Feb. 5, 2004

(30) Foreign Application Priority Data
Oct. 31, 2000 (DE) .......................................... 100 53 995

(51) Int. Cl.⁷ .............................................. B60T 17/22
(52) U.S. Cl. ........................................... 60/534; 92/5 R
(58) Field of Search .............................. 60/534; 92/5 R; 91/1

(56) References Cited

U.S. PATENT DOCUMENTS 4,793,241 A    12/1988 Mano et al.
4,914,916 A    4/1990  Leigh-Monstevens et al.
5,095,702 A    3/1992  Volz

FOREIGN PATENT DOCUMENTS

| DE | 37 38 151  C2 | 5/1988 |
| DE | 43 41 810  A1 | 6/1995 |
| DE | 195 00 137 A1 | 7/1996 |
| DE | 197 11 781 C2 | 10/1998 |
| DE | 199 15 832 A1 | 7/2000 |
| EP | 0 620 372  A1 | 10/1994 |

OTHER PUBLICATIONS

International Search Report of PCT/EP01/12269 dated Mar. 5, 2002.

German Search Report dated Mar. 20, 2001.

*Primary Examiner*—F. Daniel Lopez
*Assistant Examiner*—Michael Leslie
(74) *Attorney, Agent, or Firm*—RatnerPrestia

(57) ABSTRACT

The present invention relates to a position indicator for displaying the position of a piston within a cylinder as part of a piston-and-cylinder assembly in a brake system. The provision of a Hall element for a hydraulic generating cylinder is known in the art, with the Hall sensor mounted on the cylinder and a ring magnet mounted on the piston. An object of the invention is to describe a position indicator for a brake system, which has a simple construction and is able to provide signals relating to the position of the brake pedal relatively rapidly. This object is achieved because a Hall element of a Hall sensor is placed in the cylinder wall of the master cylinder, and because a magnetic zone is arranged in the piston-and-cylinder assembly so that the Hall element responds to the piston movement within the cylinder.

13 Claims, 2 Drawing Sheets

SIGNAL TRANSMITTER COMPRISING A HALL SENSOR INTEGRATED IN A MASTER CYLINDER

This application is a U.S. national-phase application of PCT International Application No. PCT/EP01/12269.

TECHNICAL FIELD

It is important for many control operations and alarm actions to know about the current position of an actuating element. Thus, e.g. the position of the brake pedal or the pedal's movement is characteristic of the driver's desire to slow down the vehicle. In this respect, both the course of the movement of the brake pedal and the position of the brake pedal can give an indication to what extent the driver wishes to brake the vehicle. Therefore, suggestions have been made to measure the position, the travel, or the variation of travel of the brake pedal by means of sensors. The measured values are then introduced into the regulating device of a brake system. The measured values may further be sent to a light display indicating to the other traffic members that the brake of a vehicle is being applied. Presently customary brake light switches are hence arranged at the pedal. The electrical coupling in this zone is disadvantageous. It is also a shortcoming that these types of switches are not particularly reliable. Further, pressure switches arranged in the tandem master cylinder have been disclosed which are used as brake light switches. It is unfavorable that the signal is emitted quite late.

BACKGROUND OF THE INVENTION

German application DE-OS 19915832 discloses equipping a hydraulic generating cylinder with a Hall element, with the Hall sensor being mounted on the cylinder and a ring magnet being mounted on the piston.

BRIEF SUMMARY OF THE INVENTION

Therefore, the present invention is based on a position indicator for displaying the position of a piston within a cylinder in a cylinder-and-piston assembly, preferably for a controlled brake system for automotive vehicles.

An object of the present invention is to describe a position indicator for a brake system, which has a simple design and is able to provide signals describing the position of the brake pedal in a comparatively quick manner.

This object is achieved according to the present invention in that the cylinder-and-piston assembly is a master cylinder of a brake system, in that a Hall element of a Hall sensor is inserted into the cylinder wall of the master cylinder, and in that a magnetic zone is arranged in the piston-and-cylinder assembly in such a way that the Hall element responds to the movement of the piston in the cylinder.

Thus, the present invention in principle resides in mounting a Hall sensor to the master cylinder of a brake system. A wear-free quick-action display is thereby achieved which mainly describes the position or movement of the pedals. A special advantage of the present invention, among others, includes that a display is ensured even if the brake is applied due to the movement of the piston in the master cylinder, without this necessarily corresponding to the position of the pedal. This feature may e.g. occur when the travel of the pedal is not identical to the travel of the piston in the master cylinder due to tolerances or lost travels. Another possibility involves that the brake in the controlled brake system is initiated without the pedal being applied (ABS, ESP). Further advantages of the invention are the following: high degree of safety, measurement of the motion start in the tandem master cylinder and, thus, a directly plausible signal. In addition, there is a high degree of accessibility in the vehicle. Further, an adjustment is also possible retroactively. The signal transmitter of the invention is favorable in terms of costs, and there are no disturbing forces at the pedal.

The invention is not necessarily restricted to the operation of a brake light; other applications are also feasible where the position of a piston in a cylinder shall be evaluated in a low-cost manner for actuating assemblies arranged downstream. A signal is sent to a control device or a plurality of control devices (ABS or other devices), which is in a direct relation to the movement of a tandem master cylinder piston and, thus, of the brake pedal as well. This signal may preferably be used for operating the stoplights.

There are several possibilities for installing the sensor within the master cylinder. Thus, a magnet may, for example, be arranged beside the Hall element in the wall of the housing. This arrangement is e.g. possible when the piston is made of a magnetic material or is provided with such a material at certain points. When the piston changes its position, the magnetic field existing between the magnet and the Hall element will also be changed, thereby possibly triggering a display. An advantageous improvement of the invention is achieved in that the magnetic zone is arranged on the outside peripheral surface of the piston and is preferably formed of a magnet connected to the piston. In this feature, the magnetic zone on the outside surface of the piston is active. This zone may be produced by locally magnetizing the piston in as far as this piston is composed of a magnetizable material. The local magnetization may, however, also be employed when the magnetic zone is arranged in the housing of the cylinder in the vicinity of the Hall element.

A particularly simple solution is achieved in that the magnet is inserted into a corresponding recess in the piston, with the magnet being preferably formed of a radially inserted magnetic circular cylinder or a tangentially arranged annular portion. In this case, the piston may also consist of a non-magnetizable material such as plastics or aluminum. Further, very high magnetic fields may be produced this way, possibly acting locally on the associated Hall element.

In an improvement of the invention not only the piston but also the housing may be manufactured from a non-magnetizable material. The result is that the material of the piston-and-cylinder assembly will not disturb the course of the magnetic field.

The position indicator of the invention may be improved to a major degree in an improvement of the present invention in that the magnet is arranged in a portion of the piston, which is acted upon by the ambient pressure of the cylinder inside the cylinder. Both the Hall element and the magnet are kept free from pressure forces so as to minimize the mechanical load on these parts mounted into the assembly. Another advantage of this provision resides in that weakening of the housing due to the arrangement of an accommodating bore for a plug will not entail shortcomings because the affected portion of the cylinder housing is largely free from pressure forces.

To be able to adapt the Hall sensor as simply as possible to various types of vehicles and to facilitate the exchange of a defective sensor, it is advisable in a further development of the invention to arrange the Hall element and preferably an be performed when the piston has covered a predetermined distance, with the output signal of the sensor having reached a predetermined threshold value starting from a first predetermined threshold value.

DETAILED DESCRIPTION OF THE PREFERRED EMBODIMENTS

The design and mode of operation of master cylinders is appropriately described in literature (cf. for example, in Bremsen-Handbuch (Brake Handbook) by Autohausverlag GmbH Ottobrunn close to Munich, edition 9.1) and, therefore, will not be described once more. In the following, the design of the master cylinder illustrated in FIG. 1 is only dealt with to the extent necessary with respect to the invention.

Figure 1:
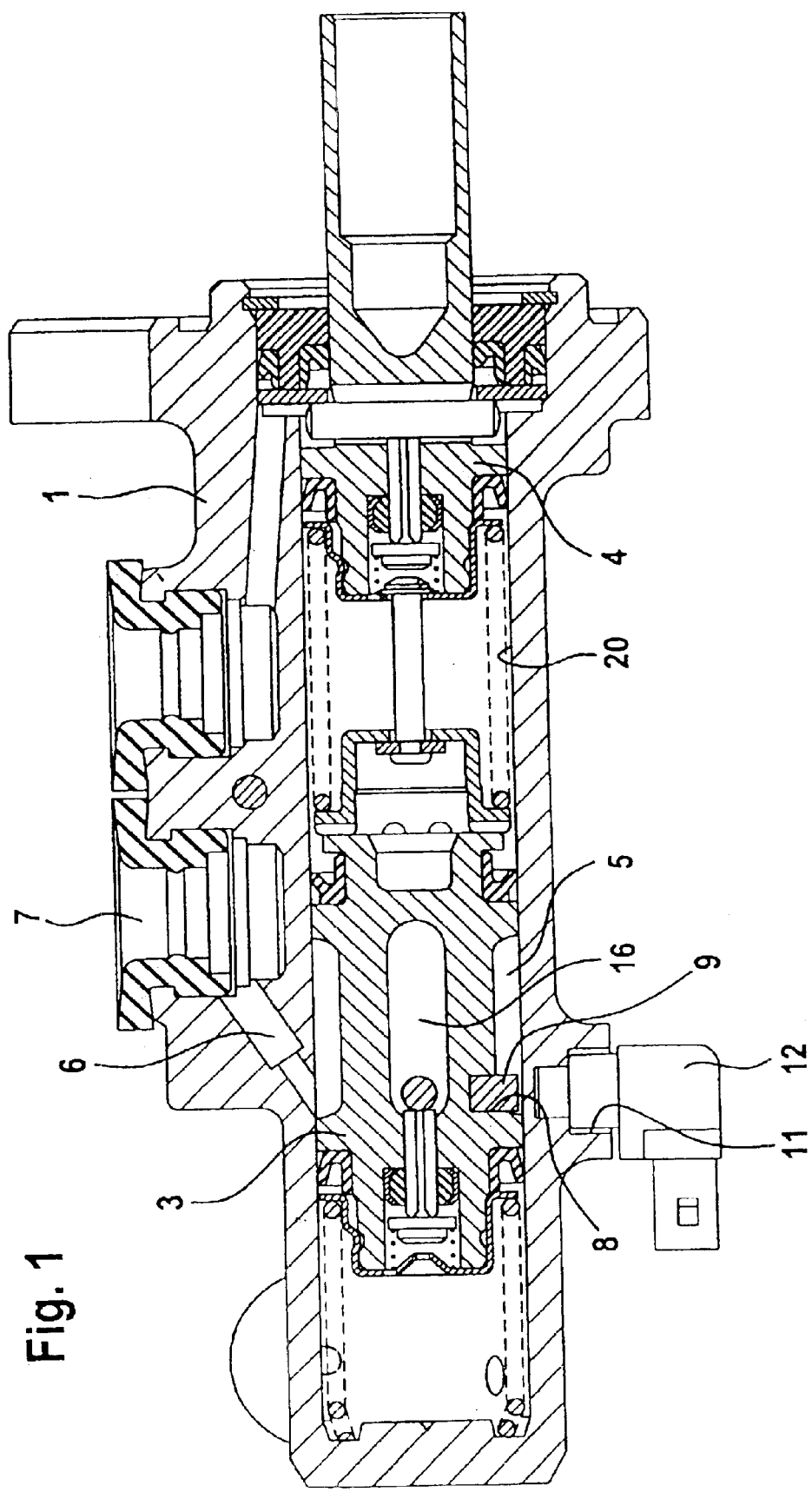
FIG. 1 shows a tandem master cylinder equipped with the position indicators of the invention.

FIG. 1 shows a tandem master cylinder wherein housing 1 of the cylinder encloses two pistons 3, 4 arranged one behind the other. A cylindrical hollow space 20 that is delimited by housing 1 is referred to as cylinder in the following. The front piston 3 has an annular recess 5, which is connected to the port 7 of the non-illustrated supply reservoir by way of a breather 6. This relieves the annular recess 5 from pressure so that basically ambient pressure of the housing 1 prevails there. A cylinder opening 8 is inserted into the bottom of the annular recess 5 at an appropriate location, into which opening a magnetic metallic pin 9 is inserted as a magnet. The housing 1 at the bottom of FIG. 1 has a projection extending in a radial direction in which a stepped blind-end bore 11 is provided. This blind-end bore accommodates a plug 12, which carries the Hall element (not shown) at its end that is at the top in FIG. 1. It is important that the blind-end bore 11 does not extend into the cylinder interior so that the smooth inside surface of the cylinder interior is not interrupted.

Hall element and magnet 9 are now arranged to each other in such a way that with a movement of the front piston 3, the voltage that is output by the Hall element, starting from a maximum, will decline, thereby causing an evaluating circuit arranged in plug 12 to respond to predetermined voltage values of the declining output voltage of the Hall element. The result is an abrupt change of voltage at the output of the plug 12 when the piston 3 moves through a defined range of the piston travel. By variation of the response values of a trigger circuit disposed in the evaluating circuit, it is possible to align the voltage variation with respect to the position of the piston so that it can be adjusted quite precisely at what location of the piston travel the position indicator responds, for example, in order to switch on a brake light.

Figure 2:
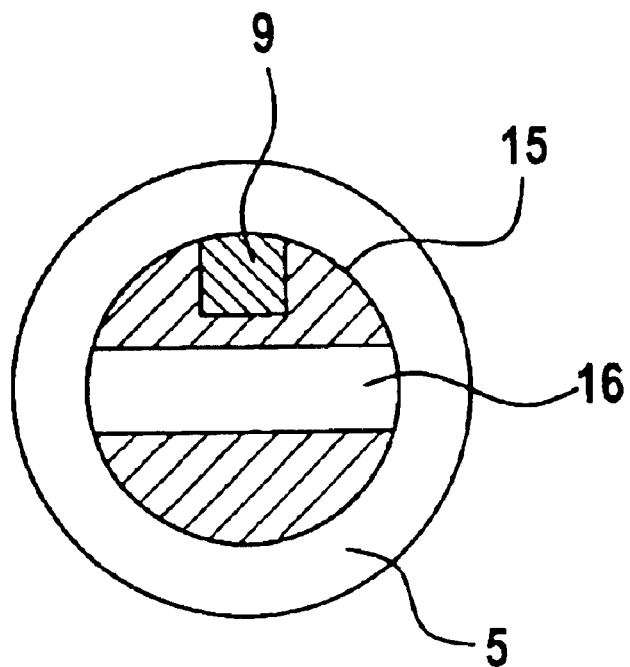
FIG. 2 and FIG. 3 show a greatly simplified cross-sectional view of the embodiment of a magnet attached to the piston.
Figure 3:
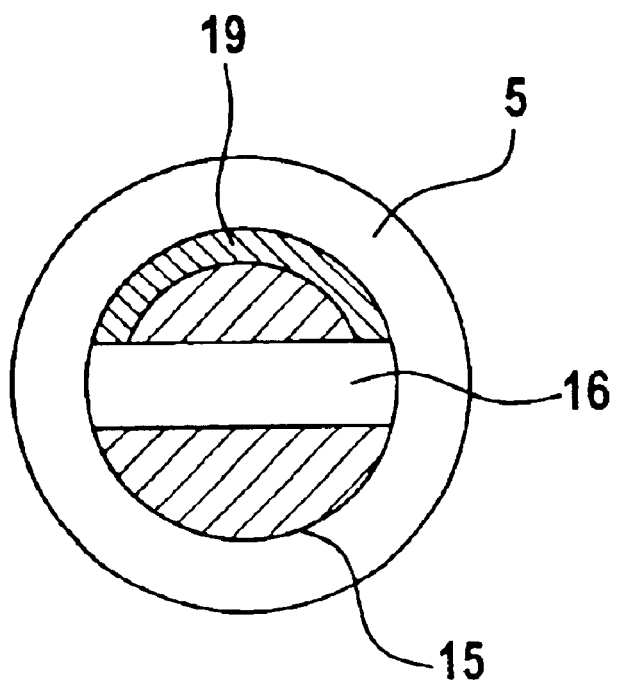

FIGS. 2 and 3 show possible embodiments of the magnet 9 illustrated in FIG. 1. Magnet 9 is shaped as a cylindrical metal pin and mounted at bottom 15 of the annular recess 5. An elongated hole 16 arranged in the front piston 3 can still be seen in FIGS. 2 and 3.

FIG. 3 shows a modified embodiment of the magnet in the form of an annular portion 9 being arranged in a corresponding recess at bottom 15 of the annular recess 5.

Similar to the sensor described hereinabove, a sensor of this type may also be installed optionally or additionally into the housing 1 opposite the rear piston 4. It is only essential in this regard that this sensor is so arranged that the magnet connected to the piston 4 is disposed in the pressureless zone of the interior of cylinder 1.

Therefore, the invention can be described briefly as follows: The signal describing the position of the piston is produced by means of non-contact sensing, preferably by means of a Hall element. A metallic component (which may also be a magnet) is fitted to one of the tandem master cylinder pistons. The zone at the tandem master cylinder piston is preferably pressureless. A sensor element (Hall sensor or Hall switch or element with a similar signal generation) is fitted to the tandem master cylinder housing in the same zone. Preferably, the element is incorporated in a zone, which remains without pressure over the entire stroke of the tandem master cylinder piston.

In an extended feature of the invention, there is the possibility of calibrating the function limits in the installed condition. The sensor element can be combined with a plug on the vehicle and may be designed so that it permits being exchanged in the vehicle. The result is a high degree of safety in measuring the start of motion in the tandem master cylinder. A directly plausible signal is, in turn, achieved herefrom. The master cylinder is easily accessible in the vehicle. Further, retroactive adjustment is possible, which is very favorable with regard to costs. Also, disturbing forces at the pedal are eliminated. It is possible to produce a signal without interrupting the closed system in the tandem master cylinder.

What is claimed is:

1. Position indicator for displaying the position of a piston within a cylinder in a cylinder-and-piston assembly for a controlled brake system for automotive vehicles, wherein the cylinder-and-piston assembly is a master cylinder of a brake system, in that a Hall element of a Hall sensor is inserted into the cylinder wall of the master cylinder, and in that a magnetic zone is arranged in the piston-and-cylinder assembly in such a way that the Hall element responds to the movement of the piston in the cylinder, wherein said magnetic zone is formed of a magnet connected to the piston on the outside peripheral surface of the piston.

2. Position indicator as claimed in claim 1, wherein the magnet is inserted into a corresponding recess in the piston, with the magnet being formed of a radially inserted magnetic circular cylinder or a tangentially arranged annular portion.

3. Position indicator as claimed in claim 1, wherein the piston and the housing forming the cylinder are made of a non-magnetizable material.

4. Position indicator as claimed in claim 1, wherein the magnet is arranged in a portion of the piston at said, which is acted upon by the ambient pressure of the cylinder inside the cylinder.

5. Position indicator as claimed in claim 1, wherein the Hall element and an evaluating circuit that processes the signals of the Hall element are arranged in a plug, and the cylinder housing includes a plug opening for receiving at least part of the plug.

6. Position indicator as claimed in claim 5, wherein the plug opening essentially is a blind-end bore that is accessible in a radial direction from outside, and the cylinder housing comprises a radial projection for engagement by the plug opening.

7. Position indicator as claimed in claim 1, wherein the master cylinder is a tandem master cylinder.

8. Position indicator as claimed in claim 5, wherein the evaluating circuit includes a trigger circuit which is triggered in dependence on defined voltage threshold values at the Hall element, and the threshold values of the trigger circuit are adjustable for adapting the signal release in relation to the piston position.

9. Position indicator as claimed in claim 1, wherein it actuates a brake light switch.

10. Position indicator as claimed in claim 1, wherein the piston and the housing forming the cylinder are made of aluminum.

11. Position indicator for displaying the position of a piston within a cylinder in a cylinder-and-piston assembly for a controlled brake system for automotive vehicles, wherein the cylinder-and-piston assembly is a master cylinder of a brake system, in that a Hall element of a Hall sensor is inserted into the cylinder wall of the master cylinder, and in that a magnetic zone is arranged in the piston-and-cylinder assembly in such a way that the Hall element responds to the movement of the piston in the cylinder, wherein the magnet is arranged in a portion of the piston, which is acted upon by the ambient pressure of the cylinder inside the cylinder.

12. Position indicator for displaying the position of a piston within a cylinder in a cylinder-and-piston assembly for a controlled brake system for automotive vehicles, wherein the cylinder-and-piston assembly is a master cylinder of a brake system, in that a Hall element of a Hall sensor is inserted into the cylinder wall of the master cylinder, and in that a magnetic zone is arranged in the piston-and-cylinder assembly in such a way that the Hall element responds to the movement of the piston in the cylinder, wherein the Hall element and an evaluating circuit that processes the signals of the Hall element are arranged in a plug, and the cylinder housing includes a plug opening for receiving at least part of the plug.

13. Position indicator for displaying the position of a piston within a cylinder in a cylinder-and-piston assembly for a controlled brake system for automotive vehicles, wherein the cylinder-and-piston assembly is a master cylinder of a brake system, in that a Hall element of a Hall sensor is inserted into the cylinder wall of the master cylinder, and in that a magnetic zone is arranged in the piston-and-cylinder assembly in such a way that the Hall element responds to the movement of the piston in the cylinder, wherein the evaluating circuit includes a trigger circuit which is triggered in dependence on defined voltage threshold values at the Hall element, and the threshold values of the trigger circuit are adjustable for adapting the signal release in relation to the piston position.

* * * * *